March 4, 1969 N. R. LAIDLAW 3,431,426

RADIATION SENSITIVE APPARATUS FOR READING PUNCHED TAPE

Filed Nov. 28, 1966

Inventor
N. R. LAIDLAW
By Cameron, Kerkam & Sutton
Attorneys 3,431,426

RADIATION SENSITIVE APPARATUS FOR READING PUNCHED TAPE

Neil Rutherford Laidlaw, Edinburgh, Scotland, assignor to Ferranti, Limited, Hollinwood, Lancashire, England, a company of Great Britain and Northern Ireland Filed Nov. 28, 1966, Ser. No. 597,270
Claims priority, application Great Britain, Nov. 30, 1965, 50,736/65
U.S. Cl. 250—219 5 Claims
Int. Cl. G01n *21/30*

This invention relates to apparatus for reading punched tape, using photo-electric methods.

The simplest way of reading punched tape in this manner is by means of a light source on one side of the tape and on the other side a photocell of some kind for each track of holes.

A difficulty arises with this method when the tape, as is usually the case, is not quite opaque, for then the cell tends to become irradiated by diffused light from the tape even when no hole is present—that is, in the reading position. Where the tape is liable to be contaminated with oil, and so be to some extent translucent, the output signal from a cell irradiated by diffusion may be large enough to suggest the presence of a hole. Even if this extreme condition is avoided, the contrast between signals when a hole is present and when it is not may be low enough to demand a critical adjustment of those subsequent stages which are to be controlled by the signal from the tape reader.

Known methods of increasing the contrast include reflection systems in which the light beam is made to pass two or more times through the tape by way of one or more mirrors. Where no hole is present, the light is diffused at each passage through the tape and only a very small proportion reaches the photocell. Where however the light is passed through the tape an even number of times, with the cell and the light source on the same side of the tape, a similar difficulty in obtaining sufficient contrast may arise if the cell should tend to respond to light diffusely reflected from the tape when no hole is present.

An object of the invention is accordingly to provide apparatus for reading punched tape in which the above-mentioned difficulties of obtaining sufficient contrast are to a large extent overcome.

In accordance with the present invention, apparatus for reading punched tape includes for each hole track optical means for causing light from a source to reach the tape in a beam in the path of the holes in that track, arrangements for supporting the tape so that in operation the tape movement causes the holes in the track to cross the beam in turn, a main photo-electric transducer located so as to be irradiated by the beam when a hole is present, an auxiliary photo-electric transducer displaced from the beam and arranged to be so responsive to irradiation from the tape, as irradiated by the beam, as to produce an output which is less than that from the main transducer when a hole is present but not less than that from the main transducer when no hole is present, and electrical means for deriving a response in dependence on the algebraic difference between the outputs from the two transducers.

Figure 1:
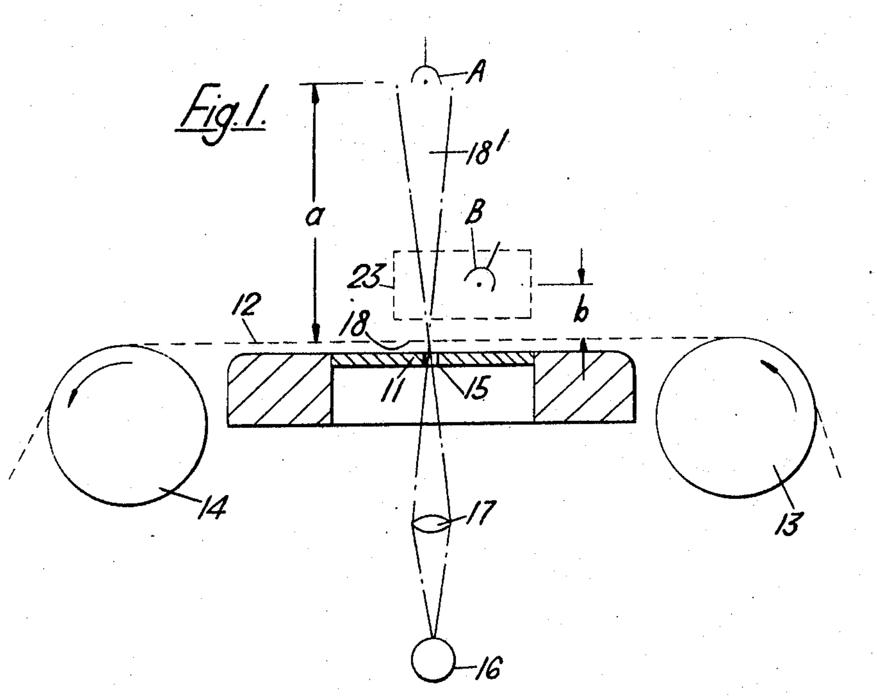
Figure 2:
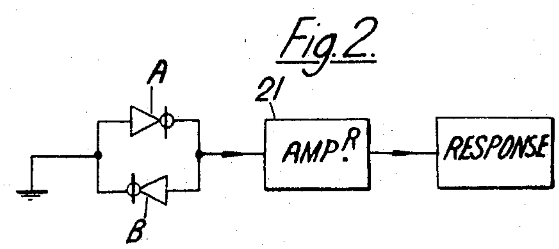
Figure 3:
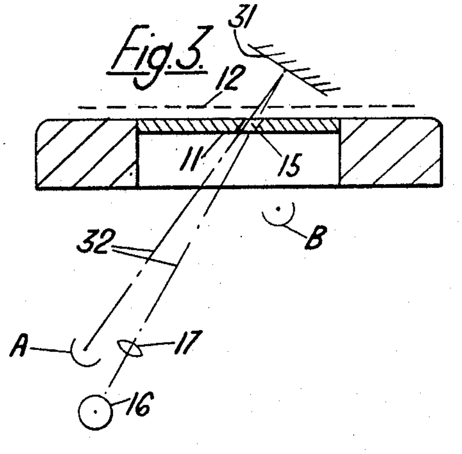

In the accompanying drawings,

FIGURE 1 shows in simplified form and partly in section one embodiment of the invention, FIGURE 2 is a schematic diagram of connections for the embodiment of FIGURE 1, and FIGURE 3 shows the apparatus of FIGURE 1 modified in accordance with another embodiment.

In carrying out the invention in accordance with one form by way of example, see FIG. 1, apparatus for reading punched tape of an appreciable degree of translucency includes an opaque mask 11 over one side of which the tape 12 is supported close and parallel to the mask as the tape is passed from roller 13 to roller 14 by driving arrangements which are not shown. The drawing is intended to be a section along the centre line of one of the hole tracks of the tape in the plane of the paper, but for clarity the tape itself is depicted only in broken lines.

For this hole track, the mask is provided with an aperture in the form of a slit 15 which extends across the path of the holes in the track and therefore normal to the plane of the paper. The arrangement is such that as the tape moves, the holes in the track cross the slit in turn. The length of the slit exceeds a hole diameter, so that the slit extends across a hole when the hole is in register with it; on the other hand the slit width is much less than this.

On the other side of the mask from the tape, optical means, including a source of illumination 16 and a lens 17, causes light to pass through the slit 15 and so reach the tape in the form of a ribbon beam 18, defined by the slit, across the path of the holes.

Facing the tape on the side of the tape remote from source 16 are main and auxiliary photocells A and B. These may conveniently be of the photo-voltaic diode type. Cell A is located so as to be irradiated by the part $\mathbf{18^1}$ of the divergent ribbon beam 18 which passes through a hole in this track when the hole is in register with the beam. Cell B on the other hand is displaced, in a direction parallel to that of tape movement, from the divergent beam $\mathbf{18^1}$, and is located considerably near the tape than is cell A.

To derive a response in dependence on the algebraic difference between the outputs from the two cells—that is to say, a response the sense or polarity of which is dependent on which cell has the stronger output—they are coupled to one another in reverse senses, as shown in FIG. 2, and to the input of an amplifier 21. The output from the amplifier is applied to whatever response equipment 22 is required to receive and intrepret the signals from this particular track.

In operation, whenever a hole in the track reaches the reading position by coming into registration with slit 15, the beam portion $\mathbf{18^1}$ passes to cell A to cause it to produce a large output. Cell B, being out of the beam, is irradiated only by the small amount of light scattered from the beam or reflected from the edges of the slit, and therefore produces an output which is considerably less than that from cell A. The signal which cell B subtracts from that of cell A is small, and in consequence the output from amplifier 21 is a large one of polarity determined by cell A.

When no hole is present, the beam 18 from the slit becomes diffused by the translucent tape over a large solid angle which includes both the cells, both of which are accordingly irradiated by light from the tape, as irradiated by the beam from source 16. As cell A is comparatively distant from the tape, each elemental area of the cell subtends only a small solid angle at the irradiated part of the tape with the result that the intensity of illumination at the cell is comparatively low and the output from it small.

Cell B, on the other hand, is comparatively close to the tape and in consequence each element of its area intercepts a comparatively large amount of light, with the result that its output is greater than that from cell A. The resultant output signal is now of polarity determined by cell B, the reverse of that determined by cell A. Hence the signal applied to amplifier 21 when no hole is present is of the opposite polarity to the signal when a hole is present.

Each of the other tracks on the tape is provided with a slit in the mask 11 and a pair of photocells individual to it. The mask is common to all the tracks. The slits may be run into one another and so extend continuously across all the tracks, with the light source 16 and lens 17 common to them.

To prevent cross-talk due to an auxiliary cell B responding to light diffused from other tracks, optical screens 23 may be provided between adjacent pairs of these cells. These screens may be high enough to provide complete or partial screening for the main cells also; but as the main cells provide only a small output in response to diffuse illumination the screening of them is less critical. Any tendency to cross-talk may be further reduced by making the slits in the mask individual to each track instead of running them together.

The photo-voltaic type of cell produces an output current dependent on the intensity of the incident light and in the forward direction of conduction. Provided that the load impedance into which the cell works is low, its output voltage does not reach a value sufficient to cause it to short-circuit its own output. In the present case, with the cells interconnected as in FIG. 2, their common load impedance is constituted by the input impedance to amplifier 21. If the two are equally irradiated there is no resultant current through the load and consequently no output voltage across it. If they are unequally irradiated a current flows in the load and the output voltage across the load becomes of one polarity or the other, as described below, according to which cell is the more intensely irradiated.

Other types of photocell may be used, with their outputs combined where necessary by a differential amplifier to produce a response dependent in the difference between their individual outputs.

The relative spacing of the cells from the tape in a plane normal to that of the split is not critical, provided that the distance $a$ (see FIG. 1) is at least equal to the distance $b$ so that when no hole is present the ouptut from the auxiliary cell B is not less than that from the main cell A. If the distance $a$ is made approximately equal to $b$, with perhaps some minor adjustment to allow for the fact that the tape is not a perfect diffuser over the full 180° solid angle but passes a greater light flux in the general direction of cell A than of Cell B, the outputs from the cells are made equal, and their differential output zero; in which case the hitherto unobtainable ideal condition of zero output to represent the absence of a hole is achieved. It is preferable, however, to make the distance $a$ considerably greater than the distance $b$, as described above, to achieve an output of one polarity in response to the presence of a hole and an output of opposite polarity in the absence of a hole. Such an output may be used as a switching waveform for subsequent circuits and is not adversely affected by changes in lamp brightness or tape translucency.

The slit may be located some distance out of the plane of the tape on the side on which the light is incident to avoid friction with the tape and consequent filling up of the slit with particles abraded from the tape. The separation distance between the tape and slit is not critical provided the edges of the slit cast a reasonably sharp shadow on the tape. Alternatively, the optical system may be designed to project a well-defined image on to the tape of a slit located elsewhere in the system.

The invention is also applicable to prevent misoperation due to diffuse reflection from an opaque tape where the beam is passed through the tape an even number of times. In such an embodiment the arrangement of FIG. 1 may be modified as shown in FIG. 3, in which the same references are used to designate components priviously mentioned.

The photocells A and B are now on the same side of the tape 12 as the source 16, the light from which reaches the cell A after reflection by a mirror 31 on the other side of the tape. For clarity, only the optical axis 32 of the light beam is shown; as is usual in such arrangements the axis is inclined to the tape, rather than normal to it as in the arrangement of FIG. 1, in order to reduce the risk of misoperation due to the response of cell A to specular reflection—that is, regular reflection as distinct from diffuse reflection—if the tape material should happen to be glossy. As before, cell B is located much closer to the tape and is similarly displaced from the beam in a direction parallel to that of tape movement. This time, however, cell B is irradiated by diffuse reflection from the near side of the tape (by way of slit 15) rather than by diffuse transmission through it. If the tape material is glossy, cell B should desirably be located so that it responds to specular reflection also, therefore providing a stronger signal when no hole is present.

The operation of the apparatus is otherwise as before.

In either of the above-described embodiments it is not essential for the auxiliary cell to be located nearer the tape than is the main cell, provided that the auxiliary cell is sufficiently the more sensitive, or its output is sufficiently more amplified, to ensure that when no hole is present the output from the auxiliary cell is not less than that from the main cell.

What I claim is:

1. Apparatus for reading punched tape having a hole track including for said hole track, optical means for causing light from a source to reach the tape in a beam in the path of the holes in that track, arrangements for supporting the tape so that in operation the tape movement causes the holes in the track to cross the beam in turn, a main photo-electric transducer located so as to be irradiated by the beam when a hole is present, an auxiliary photo-electric transducer displaced from the beam and arranged to be so responsive to irradiation from the tape, as irradiated by the beam, as to produce an output which is less than that from the main transducer when a hole is present but not less than that from the main transducer when no holes is present, electrical means for deriving a response in dependence on the algebraic difference between the outputs from the two transducers, and connections from the transducer to the electrical means.

2. Apparatus as claimed in claim 1 wherein the auxiliary transducer is located considerably nearer the tape than is the main transducer.

3. Apparatus as claimed in claim 1 where the tape has more than one track, wherein an optical screen is provided between the auxiliary transducers of adjacent tracks to prevent any of those auxiliary transducers from responding to diffused light from another track.

4. Apparatus as claimed in claim 1 wherein the optical means includes a mask having an aperture to assist in defining said beam.

5. Apparatus as claimed in claim 1 wherein each transducer is a photo-voltaic cell, said connections being such as to couple them to one another in reverse senses, thereby deriving a solarity response in polarity dependent on which cell produces the larger output.

References Cited

UNITED STATES PATENTS

| | | | |
|---|---|---|---|
| 2,916,624 | 12/1959 | Angel et al. | 250—219 |
| 3,059,119 | 10/1962 | Zenor | 250—219 |
| 3,192,388 | 6/1965 | Chen et al. | 235—61.11 X |
| 3,253,128 | 5/1966 | Chen et al. | 235—61.11 |

WALTER STOLWEIN, *Primary Examiner.*

U.S. Cl. X.R.

235—61.11

UNITED STATES PATENT OFFICE
CERTIFICATE OF CORRECTION

Patent No. 3,431,426 March 4, 1969

Neil Rutherford Laidlaw

It is certified that error appears in the above identified patent and that said Letters Patent are hereby corrected as shown below:

Column 3, line 35, "ouptut" should read -- output --. Column 4, line 57, "solarity response in polarity" should read -- polarity response --.

Signed and sealed this 24th day of March 1970.

(SEAL)
Attest:

Edward M. Fletcher, Jr.
Attesting Officer

WILLIAM E. SCHUYLER, JR.
Commissioner of Patents